US008741392B2

(12) United States Patent
McCrea et al.

(10) Patent No.: US 8,741,392 B2
(45) Date of Patent: Jun. 3, 2014

(54) ANODICALLY ASSISTED CHEMICAL ETCHING OF CONDUCTIVE POLYMERS AND POLYMER COMPOSITES

(75) Inventors: Jonathan McCrea, Toronto (CA); Konstantinos Panagiotopoulos, North York (CA); Herath Katugaha, Toronto (CA); Klaus Tomantschger, Mississauga (CA)

(73) Assignee: Integran Technologies, Inc., Mississauga, Ontario (CA)

( * ) Notice: Subject to any disclaimer, the term of this patent is extended or adjusted under 35 U.S.C. 154(b) by 461 days.

(21) Appl. No.: 12/476,506

(22) Filed: Jun. 2, 2009

(65) Prior Publication Data

US 2010/0300889 A1    Dec. 2, 2010

(51) Int. Cl.
  *B05D 3/10*  (2006.01)
  *B05D 3/12*  (2006.01)
  *B05D 3/00*  (2006.01)

(52) U.S. Cl.
  USPC .................. 427/532; 427/307; 427/322

(58) Field of Classification Search
  USPC .................. 216/7, 13, 16; 427/307, 322, 532;
  204/129, 164, 165, 173
  See application file for complete search history.

(56) References Cited

U.S. PATENT DOCUMENTS

| | | | |
|---|---|---|---|
| 3,464,108 A * | 9/1969 | Boodman et al. | 29/597 |
| 3,500,094 A * | 3/1970 | Gilbert | 310/236 |
| 3,509,400 A * | 4/1970 | Conrath | 310/248 |
| 3,625,758 A | 12/1971 | Stahl | |
| 3,652,351 A | 3/1972 | Guisti | |
| 3,671,411 A | 6/1972 | Ray et al. | |
| 3,689,303 A * | 9/1972 | Maguire et al. | 427/306 |
| 4,054,693 A | 10/1977 | Leech | |
| 4,234,398 A | 11/1980 | Yamamoto | |
| 4,425,380 A | 1/1984 | Nuzzi | |
| 4,552,626 A | 11/1985 | Stevenson | |
| 4,592,852 A | 6/1986 | Courduvelis | |
| 4,601,784 A | 7/1986 | Krulik | |
| 4,704,196 A | 11/1987 | Saito | |
| 4,839,006 A | 6/1989 | Nakao | |
| 4,859,300 A | 8/1989 | Sullivan | |
| 5,062,930 A | 11/1991 | Dillon | |
| 5,175,463 A * | 12/1992 | Farago et al. | 310/237 |
| 5,203,973 A * | 4/1993 | Reith et al. | 205/159 |
| 5,229,169 A | 7/1993 | Chao | |
| 5,286,413 A * | 2/1994 | Hannecart et al. | 252/500 |
| 5,352,266 A | 10/1994 | Erb | |
| 5,433,797 A | 7/1995 | Erb et al. | |
| 5,932,949 A * | 8/1999 | Ziegler et al. | 310/236 |
| 6,299,812 B1 * | 10/2001 | Newman et al. | 264/176.1 |
| 7,320,832 B2 | 1/2008 | Palumbo | |
| 7,354,354 B2 | 4/2008 | Palumbo | |
| 2005/0199587 A1 | 9/2005 | Bengston | |

FOREIGN PATENT DOCUMENTS

CA    2013299 A1    9/1990

* cited by examiner

*Primary Examiner* — Michael Wieczorek
(74) *Attorney, Agent, or Firm* — Bacon & Thomas, PLLC

(57) ABSTRACT

A novel activation/etch method is disclosed for conductive polymer substrates and conductive polymer composite substrates to achieve good adhesion to subsequently applied coatings. The method in a preferred case involves anodically polarizing conductive polymers/polymer composites in aqueous etching solutions.

19 Claims, 3 Drawing Sheets

ANODICALLY ASSISTED CHEMICAL ETCHING OF CONDUCTIVE POLYMERS AND POLYMER COMPOSITES

FIELD OF THE INVENTION

This invention is directed to the use of anodically assisted etching of a conductive polymer substrate or a conductive polymer composite substrate including a fiber reinforced polymer composite substrate, to provide good adhesion of substrate to a coating such as an electroless and/or electrodeposited metal coating. The invention involves anodically polarizing a conductive polymer/polymer composite substrate in a solution, e.g. an etching solution. The electrical conductivity of the substrate enables electrochemical polarization of the substrate resulting in the occurrence of anodic reactions on a substrate while it is exposed to and activated by an etching solution.

BACKGROUND OF THE INVENTION

The invention relates to the coating of polymer parts and, in particular, to enhancing the adhesion of coatings such as a metallic coating or paint to a polymer substrate or a polymer composite substrate by anodically assisted etching of the substrate prior to application of a coating.

Due to their low cost and ease of processing/shaping by various means, polymeric materials, which are optionally filled with or reinforced with electrically conductive materials selected from the group of metals, metal alloys, and carbon based materials selected from the group consisting of graphite, graphite fibers, carbon and carbon nanotubes, are widely used.

Metal coating of polymer parts is of considerable commercial importance because of the desirable properties obtained by combining polymers and metallic materials. In many applications filled and reinforced polymers require a metallic coating applied by electroless deposition techniques and/or electrodeposition. The metallic deposits must adhere well to an underlying polymer substrate even in corrosive environments and when subjected to thermal cycling, such as are encountered in outdoor service.

The prior art describes numerous processes for metalizing polymers to render them suitable for electroplating by conditioning a polymer substrate's surface to ensure that metallic deposits adequately bond to the surface resulting in durable and adherent metallic coatings. The most popular substrate conditioning/activation process is chemical etching. The following patent is representative of the prior art.

Stevenson in U.S. Pat. No. 4,552,626 (1985) describes a process for metallic plating filled thermoplastic resins such as filled Nylon-6®. The filled resin surface to be plated is cleaned and rendered hydrophilic and preferably deglazed by a suitable solvent or acid. At least a portion of the filler at a surface is removed, preferably by a suitable acid. Thereafter electroless plating is applied to the surface to provide an electrically conductive metallic deposit followed by applying at least one metallic layer by electroplating to provide a desired wear resistant and/or decorative metallic surface.

Permanganate etch solutions, e.g. alkaline permanganate solutions, e.g. potassium permanganate solutions, are commonly used for etching laminated circuit boards prior to copper plating in the electronics industry. Typically a 3-stage process is followed which includes: a) solvent conditioning (swelling), b) oxidative etch, and c) neutralization. In order to successfully etch the resin in the laminate board, an effective solvent must be used in the conditioning step to penetrate and swell the resin surface. This is believed to weaken the cross-link bonds in the resin and result in an increased resin removal rate in the oxidative (permanganate) etch step. The toxicity of the chromium compounds and their potential hazards as water pollutants and the safety precautions needed with sulfuric acid have increased the commercial use of permanganate solutions, particularly alkaline permanganate solutions. The following patent illustrates such use.

Leech in U.S. Pat. No. 4,054,693 (1977) discloses processes for the activation of resinous materials with a composition comprising water, permanganate ion and manganate ion at a pH in the range of 11 to 13 to provide superior peel strength following electroless metal deposition.

While acidic and alkaline permanganate solutions are very active they are, however, not very stable and rapidly decompose. The operating life of a permanganate etchant bath can be relatively limited as permanganate ions are reduced during the etching process to manganese species of lower oxidation states, such as manganate and manganese dioxide. This reduction results directly from the etching process as well as from the etchant bath conditions; for instance, an alkaline bath promotes permanganate disproportionation to yield manganate. As it is permanganate rather than manganese species of lower oxidation state which exhibit powerful polymer etching properties, the bath must either be regularly replaced with fresh permanganate solution or supplemented with additional permanganate ions to maintain etchant activity. Preferably, the permanganate concentration is maintained by oxidation of reduced manganese species present in the bath as addition of new permanganate to an existing bath or bath replacement are both expensive and burdensome. The following patent illustrates such oxidation.

Courduvelis in U.S. Pat. No. 4,592,852 (1986) describes an improved alkaline permanganate composition for etching printed circuit boards by incorporating a secondary oxidant in the solution, capable of oxidizing manganate ion to permanganate ion, such as sodium hypochlorite, chlorine, bromine, ozone, hypochlorite salts, metaperiodate salts, trichloro-s-triazinetrione and its salts, and the like.

A convenient method of permanganate regeneration is oxidative electrolysis, as is generally described by Sullivan in U.S. Pat. No. 4,859,300 (1989). Sullivan describes a permanganate process for treating plastics, e.g., printed circuit boards, to enhance the adhesion of metal plating to polymers. Electrolysis is employed to either maintain a certain permanganate level in the operating bath or to regenerate a spent or used bath. The efficiency of such electrolysis is limited by reduction reactions occurring at the cathode, specifically the reduction of permanganate and lower oxidative state manganese compounds. Reduction yielding manganese dioxide particularly limits cell efficiency. Manganese dioxide is extremely insoluble in typical etching solutions and thus, once formed, cannot be oxidized to permanganate at the anode.

Carbon-fibers and/or graphite-fibers are a popular choice for reinforcing polymers and to increase their electrical conductivity. A number of electrochemical processes are known to roughen the carbon/graphite-fiber surface to improve the adhesion between the fiber and the polymer it reinforces. Patents illustrating this is described below.

Ray in U.S. Pat. No. 3,671,411 (1972) describes the activation of carbon fibers or yarn as used in fiber reinforced composites by electrolytically treating them to improve the surface characteristics and thereby to improve fiber or yarn bonding or adhesion to a matrix material. The fiber or yarn forms the anode and a suitable electrolyte is an aqueous caustic solution.

Reith in U.S. Pat. No. 5,203,973 (1973) discloses a method to roughen the surface of carbon to improve adhesion between the metallic coating and a carbon part. Carbon parts are submersed in an aqueous solution of sodium hydroxide or potassium hydroxide and an anodic current is applied for two or three minutes.

The following patents illustrate the provision of a fine-grained metallic coating on a polymeric substrate.

Palumbo in U.S. Pat. No. 7,320,832 (2008) discloses means for matching the coefficient of thermal expansion (CTE) of a fine-grained metallic coating to the CTE of the substrate by adjusting the composition of the alloy and/or by varying the chemistry and volume fraction of particulates embedded in the coating. The fine-grained metallic coatings are particularly suited for strong and lightweight articles, precision molds, sporting goods, automotive parts and components exposed to thermal cycling and include polymeric substrates optionally reinforced with conductive fibers. The low CTEs and the ability to match the CTEs of the fine-grained metallic coatings with the CTEs of the substrate minimize dimensional changes during thermal cycling and prevent delamination.

Palumbo in U.S. Pat. No. 7,354,354 (2008) discloses lightweight articles comprising a polymeric material at least partially coated with a fine-grained metallic material. The fine-grained metallic material has an average grain size of 2 nm to 5,000 nm, a thickness between 25 micron and 5 cm, and a hardness between 200 VHN and 3,000 VHN. The lightweight articles are strong and ductile and exhibit high coefficients of restitution and a high stiffness and are particularly suitable for a variety of applications including aerospace and automotive parts, sporting goods, and the like.

SUMMARY OF THE INVENTION

It is an objective of the present invention to provide strong, lightweight composite articles for use, e.g., in automotive, aerospace and defense applications, industrial components, electronic equipment or appliances, sporting goods, molding applications and medical applications, having a coating, preferably a metallic coating applied to a polymeric substrate with enhanced adhesion, peel strength and shear strength.

It is an objective of the invention to suitably activate polymeric substrates, specifically electrically conductive polymers and conductive polymer composites, which are defined as having a bulk electrical conductivity of at least $10^{-6}$ S/m (i.e. $\geq 10^{-6}$ S/m), more preferably at least $10^{-3}$ S/m, and even more preferably at least 1 S/m, by simultaneously chemically and electrochemically oxidizing the polymer surface to enhance the adhesion to subsequently applied metallic or polymeric coatings.

It is an objective of the invention to provide a process for improving the bonding properties of a coating to a conductive substrate comprising a polymer and/or a polymer composite, said process comprising the steps of:

i. subjecting at least part of an outer surface of said substrate to anodic polarization in an aqueous solution for a period of time in the range of about 25 seconds to 5 hours while applying a current density in the range of about 0.001 to 10 A/cm² to said substrate to activate said outer surface, and ii. applying a metallic or non-metallic coating to at least part of said activated outer surface to provide a coated substrate.

The above objective is met by a primary embodiment of the invention herein.

It is an objective of the invention to apply a metallic coating to the polymeric substrate by a convenient and cost-effective production process. The substrate comprises a material selected from the group consisting of a conductive polymer or a polymer filled with or reinforced with conductive particulates including fibers. The coating material is selected from the group consisting of polymeric coatings, including paints and metallic coatings including amorphous, fine-grained and coarse-grained metal, metal alloy or metal matrix composite coatings. In the case of metallic coatings, the metallic coating layer is applied to the polymer substrate by a suitable metal deposition process. Preferred metal deposition processes include electroless deposition, electrodeposition, physical vapor deposition (PVD), chemical vapor deposition (CVD), gas condensation and cold spraying techniques.

It is an objective of the invention to achieve good adhesion between a polymeric substrate and a metallic coating comprising metallic material and optionally containing particulates, having a crystalline microstructure with a fine-grain size, i.e., with an average grain size between 2 nm and 10,000 nm through at least part of its thickness. The metallic microstructure can also be or contain amorphous and/or coarse-grained sections.

It is an objective of the invention to achieve an adhesion strength as measured using ASTM D4541-02 Method A-E "Standard Test Method for Pull-Off Strength of Coatings Using Portable Adhesion Testers" between the coating and the activated substrate which exceeds 300 psi, preferably exceeds 500 psi and more preferably exceeds 600 psi.

According to this invention patches or sleeves which are not necessarily uniform in thickness can be deposited in order, e.g., to enable a metallic thicker coating on selected sections or areas particularly prone to heavy use such as selected aerospace and automotive components, sporting goods, consumer products, electronic devices and the like.

It is an objective of the invention to use polymeric substrates, e.g. as indicated, exhibiting a coefficient of linear thermal expansion (CLTE) in the range of $-5 \times 10^{-6} K^{-1}$ to $250 \times 10^{-6} K^{-1}$ at room temperature. Examples of suitable non-metallic substrates are glass, polymeric resin composites or other filled polymeric materials including, but not limited to, acrylonitrile-butadiene-styrene (ABS), polypropylene, polyethylene, polystyrene, vinyls, acrylics, amides and polycarbonates. Suitable fillers include carbon, graphite, metals, ceramics, oxides, carbides, nitrides, polyethylene, fiberglass and glass in suitable forms including fibers and powders.

It is an objective of this invention to provide composite articles composed of a fine-grained metallic coatings on substrates capable of withstanding 1, preferably 5, more preferably 10, more preferably 20 and even more preferably 30 temperature cycles between liquid nitrogen (T=~–196° C. for one minute) and hot water (T=~90° C. for one minute) without delamination.

It is an objective of this invention to provide composite articles capable of withstanding 1, preferably 5, more preferably 10, more preferably 20 and even more preferably 30 temperature cycles without failure according to ANSI/ASTM specification B604-75 section 5.4 (Standard Recommended Practice for Thermal Cycling Test for Evaluation of Electroplated Plastics ASTM B553-71) for service condition 1, preferably service condition 2, preferably service condition 3 and even more preferably for service condition 4. The objective is met in a preferred case of the invention.

It is a principal objective of the invention to apply a dual process to enhance the bonding strength between polymeric materials and metallic coatings in a synergistic fashion by concurrently combining chemical etching and electrochemical etching.

It is the objective of the invention to simultaneously etch polymeric materials chemically and electrochemically reducing the overall treatment times required.

It is another objective of the invention to employ a number of aqueous solutions containing at least one etching compound selected from the group consisting of acidic and alkaline chemical etching solutions including sodium hydroxide, potassium hydrochloride, phosphoric acid, nitric acid, boric acid, sulfuric acid, hydrofluoric acid and chromic acid as well as etching solutions employing oxidizing agents including, but not limited to, permanganate (e.g. alkaline permanganate, e.g. potassium permanganate), sodium hypochlorite, chlorine, bromine, peroxide and ozone. This objective is met in a preferred case of the invention.

It is another objective of the invention to provide a process which is economic, substantially reduces the activation time and provides consistent activation over a prolonged period of bath use.

It is another objective of the invention to pretreat the surface of a polymeric substrate to achieve excellent adhesion between a coating, preferably a metal coating, and a polymer substrate for components and articles exposed to temperature cycling, increasing the acceptable CLTE mismatch between substrates and the metal coatings.

It is an objective of the invention to pretreat the surface of a polymeric substrate to provide a surface roughness to an activated outer surface in the range of Ra=0.01 µm to Ra=50 µm prior to applying the fine-grained metallic coating. In the context of this application the average roughness Ra is defined as the arithmetic mean of the absolute values of the profile deviations from the mean line and is by far the most commonly used parameter in surface finish measurement. This objective is met in a preferred case of the invention.

All of the above objectives are obtained in one or more embodiments of the invention.

As used herein, the term "article" means an item a portion or all of which contains the polymer substrate or polymer composite substrate and the coating.

As used herein the term "coating" means deposit layer applied to part or all of the substrate exposed surface.

As used herein, the term "coating thickness" refers to depth in a deposit direction.

As used herein "electrode area" means the geometrical surface area of the polymer substrate or polymer composite substrate which can be effectively anodically activated or coated expressed in $cm^2$.

As used herein "anodically assisted chemical etching" means that the surface of a substrate to be coated is activated by applying anodic polarization to the substrate which is submersed in a chemical etching solution, thereby simultaneously chemically and electrochemically activating the surface to achieve a superior bond between the substrate and the subsequently applied coating.

BRIEF DESCRIPTION OF THE DRAWINGS

In order to better illustrate the invention by way of examples, descriptions are provided for suitable embodiments of the method/process/apparatus according to the invention in which.

DETAILED DESCRIPTION

Figure 1:
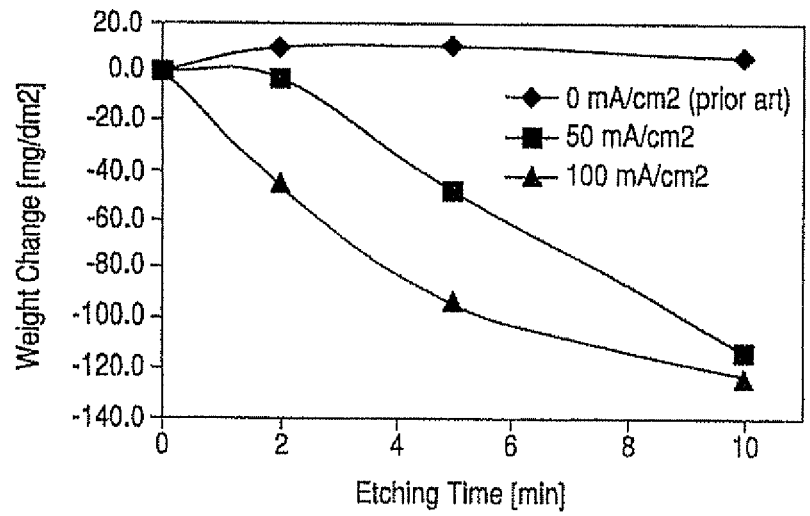
FIG. 1 displays the mass loss as a function of etch time for HTM512 conductive polymeric substrates etched at different anodic current densities.

Applying metallic or polymeric coatings to molded polymer parts is in widespread use in consumer and sporting goods, automotive and aerospace applications. Achieving excellent bond strength between the coating and the substrate is of paramount importance. Polymer composites with carbon/graphite fiber are relatively inexpensive, easy to fabricate and machine; however, they are not very durable and in case of molds or tools only suitable for prototypes or limited production runs. Organic or metallic coatings are therefore frequently applied to polymers and polymer composites to achieve the required mechanical strength, wear and erosion resistance and to obtain the desired durability and service life.

It has been surprisingly discovered that the surface activation of conductive polymers/polymer composites is greatly enhanced by simultaneously applying anodic polarization and chemical etching referred to as "anodically assisted chemical etching" or "anodic assisted etching". The application of anodic assisted etching does not only drastically enhance the bond strength between the activated substrate and the applied coating but it also reduces the consumption of the chemical etching solution, thereby extending the bath life and providing for more consistent etch performance with reduced part to part variation with time.

According to one aspect of this invention metal coated carbon/graphite-fiber polymer composite parts including molds and their components with low thermal expansion characteristics can be formed. Carbon/graphite-fiber polymer composite molds are popular for fabricating composite prototypes for the aerospace industry. Carbon/graphite-fiber polymer composite molds are cheap but lack durability and therefore find use only for prototyping. Depositing, e.g., fine-grained metals such as Ni—Fe alloys onto the carbon/graphite-fiber polymer composite molds provides for tremendous cost savings over the traditional approach of machining and forming Invar molds.

Similarly, carbon/graphite-fiber polymer composites are also a popular choice for aerospace components including fuselage, wings, rotors, propellers and their components as well as other internal and external structures that are prone to erosion by the elements including wind, rain, hail and snow or can be damaged by impact by debris, stones, birds and the like. Aerospace and defense applications also particularly benefit from a strong, tough, hard, erosion-resistant fine-grained coating.

Suitable coated polymer articles furthermore comprise medical equipment including implants and surgical tools; cylindrical objects including gun barrels, shafts, tubes, pipes and rods; molds and molding tools and equipment; sporting goods including golf shafts, heads and faceplates, arrows, baseball bats, hockey sticks, fishing, skiing and hiking poles; components and housings for electronic equipment including cell phones, personal digital assistant devices (PDAs), walkmen, discmen, MP3 players, digital cameras and other recording devices; and automotive components including liquid conduits such as fuel rails; spoilers, grill-guards and running boards; brake, transmission, clutch, steering and suspension parts; brackets and pedals, muffler components, wheels, vehicle frames; fluid pumps, housings and tank components such as oil, transmission or other fluid pans and gas tanks; electrical and engine covers; turbocharger components and the like.

In applications where coatings are applied to substrates it is usually desired for the coefficient of thermal expansion (CTE) of, e.g., the metal coating to be closely matched to the CTE of a polymeric substrate or a polymer composite substrate to avoid delamination. Similarly in molding applications (blow, injection, compression molding and the like) good matching of the thermal expansion properties of all components is required to avoid spring-back and delamination during the heating and the cooling cycle.

The composition of the coatings and substrates as well as the volume fraction and chemistry of the particulate additions can be chosen to match the coating and the substrate thermal expansion properties. It is understood in this context that matching the substrate and coating CTEs does not necessarily mean that the respective CTEs are identical but that the "relative mismatch" between the coating and the substrate is reduced to the extent required to provide the desired thermal cycling durability for the particular application. The tolerable "CTE mismatch" depends on the application, the adhesion between the coating and the polymer substrate, the maximum and minimum operating temperature and the number of temperature cycles the article is required to withstand in its operating life. In all instances, after a predetermined number of thermal cycles, consisting either of submersing the article in liquid nitrogen for one minute followed by submersion in hot water for one minute, or other suitable thermal cycling tests, the coating and substrate and the relation of coating to the underlying substrate should not fail. Delamination, blistering or cracking of the coating and/or the substrate which would compromise the appearance or performance of the article are all considered failure. Similarly, a displacement of the coating relative to the underlying substrate of more than 2% constitutes failure.

A suitable test for evaluating thermal cycling properties is ANSI/ASTM specification B604-75 section 5.4 Test (Standard Recommended Practice for Thermal Cycling Test for Evaluation of Electroplated Plastics ASTM B553-71). The samples are subjected to a thermal cycle procedure as indicated in Table 1 below. The sample is held at the high temperature for an hour, cooled to room temperature and held at room temperature for an hour and subsequently cooled to the low temperature limit and maintained there for an hour.

TABLE 1

Standard Recommended Practice for Thermal Cycling Test for Evaluation of Electroplated Plastics According to ASTM B553-71

| Service Condition | High Limit | Low Limit |
| --- | --- | --- |
| 1 (mild) | 60° C. | −30° C. |
| 2 (moderate) | 75° C. | −30° C. |
| 3 (severe) | 85° C. | −30° C. |
| 4 (very severe) | 85° C. | −40° C. |

Selected substrates, particularly polymeric substrates and filled or reinforced polymeric substrates, can display coefficient of thermal expansion values which are not isotropic but vary significantly with the direction. As an example, glass filled polyamide can have coefficient of linear thermal expansion (CLTE) values as low 20-75 ppm/° C. in one direction and as high as 100-250 ppm/° C. in another direction. Usually fibers align in the plane of the part, and when metallic coatings are applied to such parts, the relevant CLTE of the polymer in the plane that expands/contracts in concert with the metallic coating is the lower CLTE value. The high CLTE value is typically representative of the polymer in the direction perpendicular to the coating where the expansion/contraction does not exhibit the same stress on the bond between the metallic coating and an underlying substrate. In addition to the degree of CLTE match or CLTE mismatch between the coating and the substrate, the bond strength between the coating and the substrate plays an important role in preventing delamination and the relative coating/substrate displacement in industrial composite parts exposed to thermal cycling. To clarify, the stronger the bond strength between the substrate and the coating, the more CLTE mismatch and the higher the temperature fluctuations the composite can endure. It is therefore of crucial importance to suitably pretreat/activate the polymeric surface to ensure the bond strength to the coatings and particularly metallic coatings is optimized. Of course, mechanical properties of the substrate and coating are important as well, particularly the yield strength, resilience and elongation.

In order to apply electrochemical oxidation to the polymeric substrates, the polymeric substrates need to be sufficiently conductive to enable the anodic polarization of the polymer surface to be coated. Polymeric materials can be inherently conductive or rendered conductive by inclusion of conductive additives selected from the group of metal, carbon and graphite powders, flakes, chips, fibers or yarns.

Suitable polymeric substrates include resins such as filled epoxy resins, bismaleimide resins, phenolic resins, polyester resins, urea resins, melamine resins; thermoplastic polymers such as thermoplastic polyolefins (TPOs), polyethylene, polypropylene, polyimide, and polyamides; mineral filled polyamide resin composites, neoprenes, polybutadienes, polyisoprenes, polyurethanes, butadiene-styrene copolymers, chlorinated polymers such polyvinyl chloride (PVC), fluorinated polymers such as polytetrafluoroethylene (PTFE), polyesters, liquid crystal polymers such as partially crystalline aromatic polyesters based on p-hydroxybenzoic acid and related monomers, polycarbonates and acrylonitrile-butadiene-styrene (ABS); and their blends. These polymers are rendered conductive by adding suitable conductive fillers including carbon, carbon nanotubes, graphite, graphite fibers, carbon fibers, metals, metal alloys, and metallized fibers such as metal coated glass fibers and the like. Appropriate conductive filler additions in the substrate range from as low as 2.5% by volume or weight to as high as 95% by volume or weight. In addition to conductive fillers, non-conductive fillers such as glass fibers, ceramics and mineral fillers such as talc, calcium silicate, silica, calcium carbonate, alumina, titanium dioxide, ferrite, and mixed silicates (e.g. bentonite or pumice) can be employed as well. Filled polymers frequently have electrical conductivities which are anisotropic similar to CLTEs, as discussed above. Fibers usually align in the plane and the electrical and thermal conductivities of such composites in the plane can be 10-100 times higher than perpendicular to the plane. Directional conductivities therefore need to be considered to appropriately establish the electrical contacts to the substrate for providing the anodic polarization.

Particularly suitable substrates include carbon fiber composites in which the resin components include phenolic resins, bismaleimide resins, epoxy resins, polyester resins, urea resins, melamine resins, polyimide resins, polyamide resins as well as carbon fiber composites containing matrix elastomers such as natural rubber, polybutadienes, polyisoprenes, butadiene-styrene copolymers, polyurethanes, or containing thermoplastics such as polyethylene, polypropylene, and the like.

In addition to non-conductive polymers rendered sufficiently conductive by adding conductive powders or fibers, a number of intrinsically electrically conductive polymers are known as well such as halogen derivatives of polyacetylene, polyaniline, polypyrrole, polythiophane, poly-ethylenedioxythiophene, poly-phenylene-vinylidene, poly-thiophene, poly-dialkylfluorene, polyanisidine and blends and derivatives of these base polymers with conductivities of $10^2$ $Sm^{-1}$, preferably greater than $10^5$ $Sm^{-1}$. Blends of intrinsically conductive polymers with conventional non-conductive polymers (conductivities $<<10^{-6}$ $Sm^{-1}$) including polyethylene, polypropylene, polystyrene, PVC, phenol formaldehyde resins, polyamides, and different types of thermoplastic elastomers are contemplated as well. So are filled electrically conductive polymers using the fillers listed above.

We turn now to the metallic coatings. In one case the metallic material is a metal selected form the group consisting of Ag, Au, B, Cu, Co, Cr, Mo, Ni, Sn, Fe, Pd, Pb, Pt, Rh, Ru, W, and Zn or an alloy of two or more of these metals. In another case the metallic material is an alloy of one or more elements selected from the group consisting of Ag, Au, Cu, Co, Cr, Mo, Ni, Sn, Fe, Pd, Pb, Pt, Rh, Ru and Zn and optionally one or more elements selected from the group consisting of B, P, C, S and W. Metallic coatings can have a coarse-grained, fine-grained or amorphous microstructure. One or more metallic coating layers of a single or several chemistries and microstructures can be employed. The metallic coating can be suitably exposed to a finishing treatment, which can include, among others, electroplating, i.e., chromium plating and applying a polymeric material, i.e., a paint or adhesive.

As highlighted, the conventional form of activating polymer and polymer composite surfaces remains wet-chemical etching using mineral acids, bases or oxidizing agents. Electrochemical pretreatments heretofore were limited to surface improve graphite fibers or used to rejuvenate spent oxidizing etching solutions.

The electrochemical process of the invention is used as an alternative to only use of chemical etching for activation of polymer and polymer composite substrates and comprises the step of subjecting the conductive polymer or polymer composite to an oxidizing electrolytic reaction in an aqueous solution, preferably an etching solution. It has been surprisingly discovered that the simultaneous chemical and electrochemical etching of polymeric substrates substantially enhances the bond, peel and shear strength between the polymeric substrate and the applied coating.

It is known that during anodic polarization in aqueous solutions nascent oxygen forms at the anode, which is a powerful oxidizer. While not wishing to be bound by theory it is likely that carbon-oxygen bonds and functional hydroxyl and carboxyl groups are formed at, or become attached to, the polymer surface contributing to the significant improvement in bonding properties observed. It is also believed that the unexpected adhesion strength enhancement observed is due to the local generation of powerful oxidizing agents, i.e., right on the polymer surface to be etched and the surface concentration of the oxidizing agents generated on and near the polymer surface is much higher than in the bulk solution. As nascent oxygen and other oxidizing compounds generated are usually not very stable and decompose rapidly, introducing them into a bulk etching solution will therefore not generate the same results.

Any aqueous electrolyte that will generate nascent oxygen at the anode can be used to practice this invention. Examples of suitable electrolytes include aqueous solutions of sodium hydroxide, potassium hydroxide, phosphoric acid, nitric acid, chromic acid, sulfuric acid, chromic acid and the like.

As highlighted, it is a requirement of the invention to employ suitable electrolytes which (i) provide chemical etching and (ii) provide suitable ionic conductivity to be employed as electrolytes for the anodic activation.

Any oxidizing agent may be employed which is stable and soluble in the electrolyte. A particularly preferred electrolyte employs aqueous solutions of permanganate, as (i) it is a powerful oxidant, (ii) the reaction products such as manganates and manganese oxide precipitates can be rejuvenated by anodic oxidation, and (iii) permanganates can be anodically oxidized to oxidation levels even higher than +7 further enhancing the oxidation power. It is also generally preferred to employ alkali metal or alkaline earth metal salts such as sodium, potassium, lithium, cesium, calcium, etc., with potassium permanganate being preferred because of its availability and demonstrated effectiveness. The amount of permanganate salt used in the solution may vary widely from about 1 g/l up to the limit of solubility in the medium. A preferred range is about 10 g/l to 150 g/l and more preferably about 40 g/l to 100 g/l. Periodically, bath maintenance is performed to maintain the pH and permanganate ion concentration at preferred levels/ranges.

Manganate ion formed during a treatment process reduces the activity of the solution and leads to manganese dioxide sludge formation. The use of the anodic oxidation may also result in the effective oxidation of manganate to maintain the desired permanganate concentration and activity of the solution. Periodically or continuously, permanganate ions may be added to the solution to maintain the solution at the desired permanganate ion concentration as some $MnO_x$ may precipitate at the cathode reducing the available Mn-ion concentration in solution. Other additives, such as wetting agents, may be used in the composition for special purposes as is known in the art.

While the anodic oxidation process can be applied either as a batch process or as a continuous process, the method is particularly suited for continuous processing in applications requiring consistent part properties, as the strength and the effectiveness of the etching solution does not rapidly degrade with use due to the continued electrochemical rejuvenation of the oxidizing compounds and/or the continuous generation of nascent oxygen.

The process operates over a fairly wide temperature range (10°-100° C.) and higher rates of reaction achieved at higher temperatures can be compensated for by prolonged treatment times or higher applied anodic currents at lower temperatures.

Similarly, any current density can be employed which is sufficient to produce nascent oxygen and/or to rejuvenate the oxidation agent at the anode sufficiently to result in improving the bonding properties of polymer composite surfaces. In general, a current density in the range of 0.001 to 10 $A/cm^2$ is applied. It is usually preferred to employ a current density in the range of about 0.010 to 1 $A/cm^2$.

The treatment times usually range from about 25 seconds to 5 hours, preferably from about 1 minute to 30 minutes.

The process results in an improvement in adhesion, shear strengths and bonding properties between the polymers or polymer composites and the applied metallic or non-metallic coatings.

To practice the method of the invention the polymeric substrate is contacted with the electrolyte solution preferably at an elevated temperature under anodic polarization for a time sufficient to render the surface receptive to the subsequent coating process. After the treatment polymeric materials are removed from the solution, rinsed, suitably neutralized and washed. The suitably activated polymeric substrate can subsequently be coated using any known coating process including electroless Cu, Ni or Ag deposition. Other methods of deposition may also be used such as vacuum vapor deposition, electrodeposition or a combination of electroless plating and electrodeposition.

The person skilled in the art of metal plating will know how to apply electroless or electroplating of selected metals, alloys or metal matrix composites choosing suitable plating bath formulations and plating conditions. Similarly, the person skilled in the art of other metal deposition methods including physical vapor deposition (PVD), chemical vapor deposition (CVD), gas condensation and cold spraying techniques will know how to prepare fine-grained metal, alloy or metal matrix composite coatings. Furthermore, the person skilled in the art of non-metallic coating methods will know how to apply these.

The following listing describes suitable property ranges for practicing the invention:

Substrate (after Anodic Assisted Etching):
Minimum surface roughness [μm]: 0.01; 0.05;
Maximum surface roughness [μm]: 25; 50;
Coating:
Minimum thickness of the deposit [μm]: 0.1; 1;
Maximum thickness of the deposit [μm]: 5; 25;
Coated Substrate (after Anodic Assisted Etching):
Minimum adhesion strength according to ASTM D4541-02 Method A-E [psi]: 200, 400; preferably exceeding 300, 500, or 600.
Maximum adhesion strength according to ASTM D4541-02 Method A-E [psi]: 3,000; 5,000;
Minimum thermal cycling performance according to ASTM B553-71: 1 cycle according to service condition 1 without failure;
Maximum thermal cycling performance according to ASTM B553-71: 10 or 20 or 30 or infinite number of cycles according service condition 4 without failure.

The following working examples illustrate the benefits of the invention, namely etching of various carbon/graphite-fiber containing composites in an alkaline permanganate etch solution with and without anodic assist (Working Example I, II and III); and etching of carbon fiber/bismaleimide prepregs in various etching solutions with and without anodic assist (Working Example IV).

Working Example I

5×5 cm coupons were cut from an 6 mm thick fully cured conductive carbon-fiber reinforced plastic (CFRP) sheet of HTM 512, a bismaleimide pre-impregnated carbon fiber cloth composite used in high temperature resistant composite tooling available from the Advanced Composites Group Ltd. of Heanor, Derbyshire, United Kingdom. The coupons were ground on both sides with 80 grit SiC paper to a consistent surface roughness. Samples were then cleaned with Alconox and steel wool, followed by ultrasonically cleaning in deionized water for 5 minutes. The samples were rinsed in isopropanol, dried and degreased with 1,2-dichloroethane to remove any residual oils and/or films.

All samples were weighed, all surfaces but the frontal surface masked, and then the coupons were individually racked and etched with anodic assist in an alkaline permanganate solution (M-Permanganate P, Product Code No. 79223) available from MacDermid Inc. of Waterbury, Conn., USA at 45° C. except for the control sample which was etched at 65° C. (within the suppliers' recommended temperature of 65° C. to 85° C.) and at current densities of 0 mA/cm$^2$ (control experiment, without anodic assist), as well as 50 and 100 mA/cm$^2$ for 0, 2, 5 and 10 min. Following etching, the samples were rinsed in deionized water and submerged in neutralizer solution (M-Neutralize, Product Code No. 79225 also available from MacDermid Inc.) for 5 minutes at room temperature. After neutralizing, the samples were rinsed with deionized water and ultrasonically cleaned with isopropanol for 2 min. After drying the coupons were weighed to determine the mass change induced by the various etching treatments.

FIG. 1 displays the total weight change observed for the HTM512 samples, as a function of treatment time for the conventional etch and the two anodic assisted etches. It is notable that the control samples (without anodic assist) actually gained weight during etching, presumably at least in part due to $MnO_2$ precipitates forming on the coupons.

Figure 2:
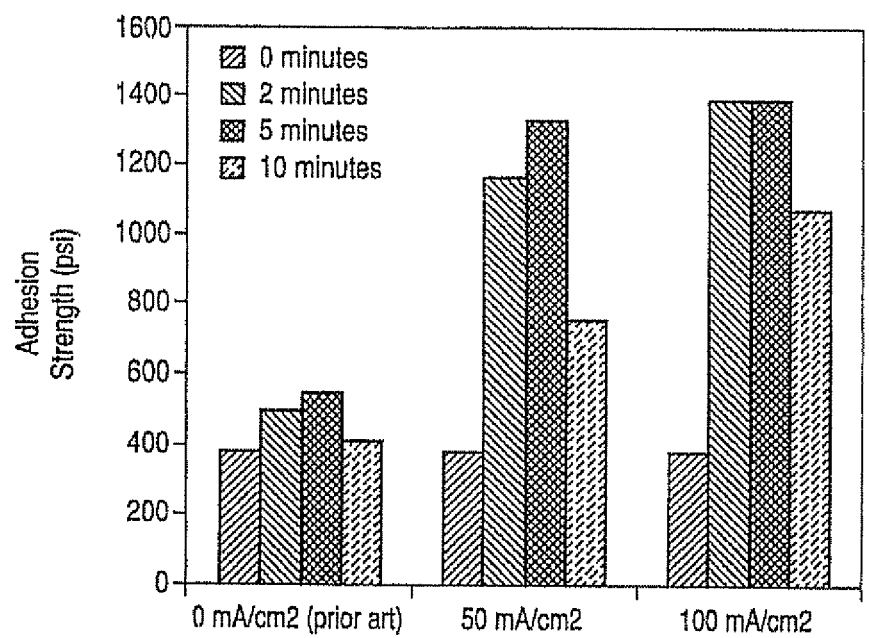
FIG. 2 shows the adhesion strength according to ASTM D4541-02 Method E as a function of etch time for HTM512 conductive polymeric substrates etched at different anodic current densities for 0, 2, 5 and 10 minutes.

Thereafter the samples were metalized using a commercial silvering solution (available from Peacock Laboratories Inc., of Philadelphia, Pa., USA) and coated with a 50 μm thick layer of fine-grained Ni-58Fe according to the process of U.S. Patent Publication No. 2005-0205425A1 published Sep. 22, 2005. Following plating the adhesion strength was measured using ASTM D4541-02 Method E "Standard Test Method for Pull-Off Strength of Coatings Using Portable Adhesion Testers" using the self alignment adhesion tester type V described in Annex A5, specifically the "PosiTest AT Adhesion Tester" available from the DeFelsko Corporation of Ogdensburg, N.Y., USA. FIG. 2 shows the drastically enhanced adhesion strength achieved with the coupons processed according to the invention.

Samples processed with anodic assisted etching were exposed to 10 cycles according ANSI/ASTM specification B604-75 section 5.4, service condition 4 without failure.

Working Example II

The same procedure was followed as in Example I; however, the 5×5 cm coupons were cut from LTM 16, a pre-impregnated carbon fiber cloth/epoxy sheet available from Advanced Composites Group Ltd. of Derbyshire, United Kingdom.

Figure 3:
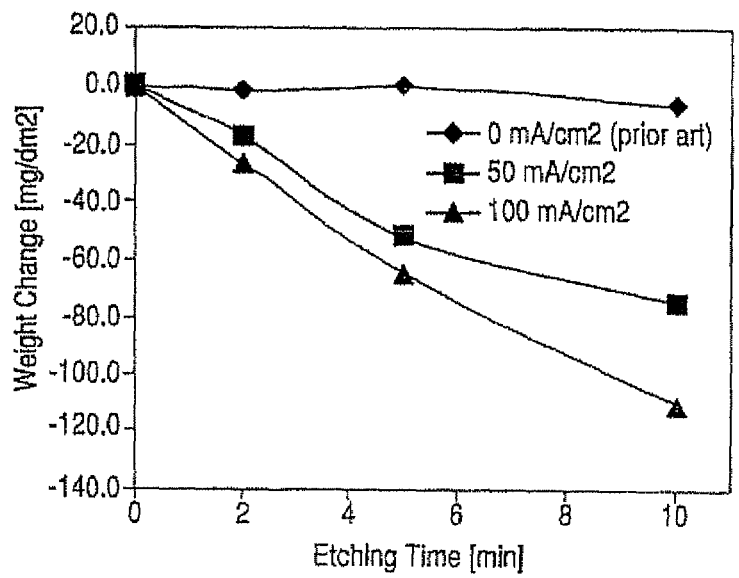
FIG. 3 displays the mass loss as a function of etch time for LTM16 conductive polymeric substrates etched at different anodic current densities.

FIG. 3 displays the total weight change observed for LTM16, as a result of etching in the permanganate solution for different current densities and treatment times.

Figure 4:
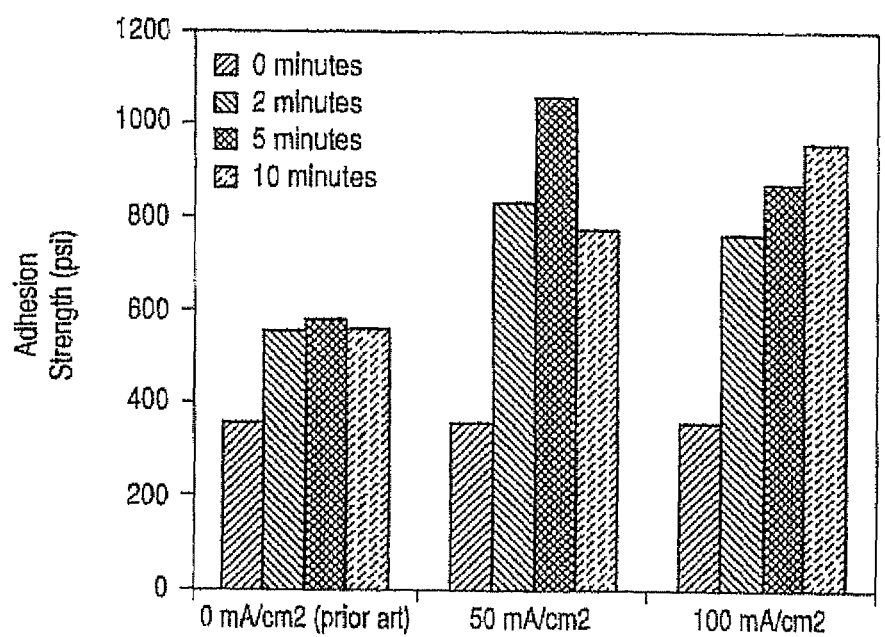
FIG. 4 shows the adhesion strength according to ASTM D4541-02 Method E as a function of etch time for LTM16 conductive polymeric substrates etched at different anodic current densities for 0, 2, 5 and 10 minutes.

FIG. 4 shows the enhanced adhesion strength achieved using ASTM D4541-02 Method E with the coupons processed according to the invention.

Samples processed with anodic assisted etching were exposed to 10 cycles according to ANSI/ASTM specification B604-75 section 5.4, service condition 4 without failure.

Working Example III

A number of commercial electrically conductive CFRP substrates including LTM212 and LTM 16, epoxy based cured CFRPs supplied by Advanced Composites Group Ltd of Heanor, Derbyshire, United Kingdom; Cytec Priform, a toughened epoxy based cured CFRP supplied by Cytec Engineered Materials Inc. of Anaheim, Calif., USA, and Hextool, a bismaleimide based cured CFRP made from randomly layered strips of uni-directional prepreg supplied by Hexcel Corporation of Dublin, Calif., USA; were exposed to a conventional and anodic assisted etch under otherwise identical conditions. Samples were processed as outlined in Example I. In all cases the substrate coupons were etched in a permanganate bath and neutralizer solution provided by MacDermid Inc as M-Permanganate (Product Code #79223), M-Neutralize (Product Code #79225). "Conventional" etching was performed at 85° C. which results in superior adhesion than samples etched at 50° C. Etching times were 5 minutes in all cases. The "anodic assisted etch" was performed using the MacDermid etching solution at 50° C., 100 mA/cm² anodic DC current and 5 minute exposure time. All anodic assisted etching was performed at 50° C. as it was noticed that the process temperature could be lowered substantially when employing anodically assisted etching resulting in reduced operating cost and evaporative losses. A sheet of mild steel (AISI 1010) was used as cathode for the anodic assisted etching. Adhesion strength values have been obtained using ASTM D4541-02 Method E using the "PosiTest AT Adhesion Tester" available from the DeFelsko Corporation of Ogdensburg, N.Y., USA.

Figure 5:
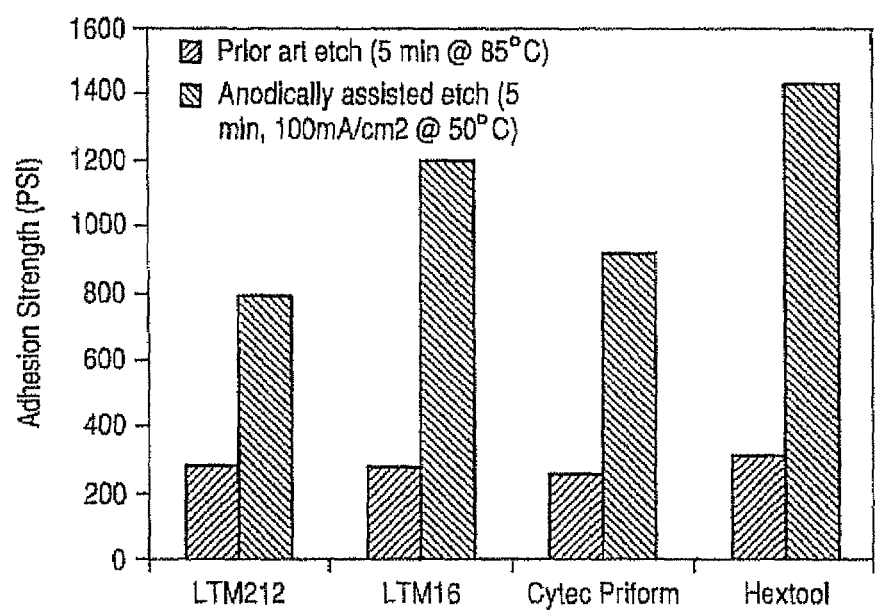
FIG. 5 provides a comparison of the adhesion strength according to ASTM D4541-02 Method E of various CFRP composites etched conventionally (passive/dip permanganate etch as per MacDermid's specifications) to those etched using the anodic assisted etch process.

FIG. 5 compares the adhesion strength for the various substrates between the prior art etch and the anodically assisted etch, highlighting the significant benefit achieved by employing the inventive anodically assisted etch.

Similar adhesion performance is observed using an anodic current density between 25 mA/cm² and 100 mA/cm² with the best performance being usually observed at a current density of between about 50 to 100 mA/cm² although, this can vary depending on the choice of the substrate and the etching solution.

Samples processed with anodic assisted etching were exposed to 10 cycles according to ANSI/ASTM specification B604-75 section 5.4, service condition 4 and did not delaminate.

Working Example IV

Carbon fiber reinforced composite coupons (3.75×8.75 cm) were processed in various etching solutions, namely an alkaline permanganate etch, a chromic acid etch, a sulfuric acid etch and a sodium hydroxide etch with and without anodic assist, thereafter silver metalized, electroplated with metallic coatings and subsequently the adhesion strength determined. In all cases the electrically conductive polymeric substrate used was the same as in Example I, namely HTM 512, available from the Advanced Composites Group Ltd., a bismaleimide based CFRP composite. The initial substrate preparation procedure was as follows: (i) mechanically abrading using 320 grit to a uniform finish, (ii) scrubbing with steel wool and Alconox cleaner, followed by a rinse in deionized water and (iii) rinsing with isopropanol, followed by drying. At this point the samples were treated for 5 minutes in the various etching solutions, then the samples were rinsed and dried and the weight change recorded as illustrated in the Tables 2-5 below. The following step included metalizing using a commercial electroless silver coating (Peacock Laboratories Inc.) and finally electroplating for 2 hrs with a fine-grained Ni-58Fe coating to a thickness of 50 μm according to US Patent Publication No. 2005-0205425A1 as in Example I.

For each different etch solution chemistry, CFRP samples were tested under 3 different conditions: 1) passive dip in solution for 5 min, 2) anodically polarized at 50 mA/cm² for 5 min, and 3) anodically polarized at 100 mA/cm² for 5 min. Following etching the samples were neutralized, as appropriate and then rinsed in deionized water and the resulting mass loss from etching was documented. Following plating the adhesion strength was measured using ASTM D4541-02 Method E using the "PosiTest AT Adhesion Tester" available from the DeFelsko Corporation of Ogdensburg, N.Y., USA.

The etch compositions, etching conditions, mass loss during etching and adhesion strength after etching are shown in the Table 2-5 below. In this experiment only the permanganate etch under all conditions tested and the sulfuric acid control etch were found to result in a weight loss. The slight increase in mass for the other solutions may be a result of "swelling" (absorption of water) during etching which is known to occur with various polymer substrates including fiber reinforced epoxy composites. In the Tables 2-5, "passive dip" means chemical etching without anodic assist.

In all etch solutions investigated a significant increase in adhesion strength is obtained (>30%) by applying an anodic current assist during etching without any increase in etching time. The adhesion strength was found to increase with increased anodic assisted etch current density (100 mA/cm² compared to 50 mA/cm²). The oxidizing etch solutions (permanganate and chromic) were found to provide the highest adhesion values.

Samples processed with anodic assisted etching were exposed to 10 cycles according to ANSI/ASTM specification B604-75 section 5.4, service condition 4 without failure.

TABLE 2

Permanganate Etch

| Solution Type | Chemical Composition | Quantity |
|---|---|---|
| MacDermid Permanganate Etch 5 min @ 45° C. | M-Permanganate M-79224 D.I. Water | 60 g/L 60 g/L 940 g/L |

| Current Density [mA/cm2] | Weight Change [mg/dm²)] | Adhesion (ASTM D4541-02 Method E) [psi] | Increase Over Passive Dip [%] |
|---|---|---|---|
| N/A Dip only | −6.7 | 433 | 0 |
| 50 | −28.5 | 668 | 54% |
| 100 | −87.0 | 1069 | 147% |

TABLE 3

Sulfuric Acid Etch

| Solution Type | Chemical Composition | Quantity |
|---|---|---|
| Sulfuric Acid Etch 5 min @ 25° C. | $H_2SO_4$ | 5% (in D.I. water) |

| Current Density [mA/cm2] | Weight Change [mg/dm²)] | Adhesion (ASTM D4541-02 Method E) [psi] | Increase Over Passive Dip [%] |
|---|---|---|---|
| N/A Dip only | −12.11 | 169 | 0 |
| 50 | 22.6 | 227 | 34% |
| 100 | 14.7 | 328 | 94% |

TABLE 4

Sodium Hydroxide Etch

| Solution Type | Chemical Composition | Quantity |
|---|---|---|
| Sodium Hydroxide Etch 5 min @ 25° C. | NaOH | 25% (in D.I. water) |

TABLE 4-continued

Sodium Hydroxide Etch

| Current Density [mA/cm2] | Weight Change [mg/dm$^2$)] | Adhesion (ASTM D4541-02 Method E) [psi] | Increase Over Passive Dip [%] |
|---|---|---|---|
| N/A Dip only | 26.8 | 185 | 0 |
| 50 | 28.9 | 409 | 35% |
| 100 | 81.6 | 643 | 248% |

TABLE 5

Chromic Acid Etch

| Solution Type | Chemical Composition | Quantity |
|---|---|---|
| Chromic Acid Etch 5 min @ 50° C. | Chromic acid | 5% |
| | Phosphoric acid | 15% |
| | Sulfuric acid | 55% (in D.I. water) |

| Current Density [mA/cm2] | Weight Change [mg/dm$^2$)] | Adhesion (ASTM D4541-02 Method E) [psi] | Increase Over Passive Dip [%] |
|---|---|---|---|
| N/A Dip only | 43.2 | 408 | — |
| 50 | 75.3 | 772 | 89% |
| 100 | 26.8 | 893 | 119% |

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A process that improves the bond between a coating and an electrically conductive substrate comprising a polymer and/or a polymer composite, said process comprising the steps of:
    activating said outer surface of the electrically conductive substrate by subjecting at least part of an outer surface of said electrically conductive substrate to anodic polarization in an aqueous solution for a period of time in the range of 5 minutes to 30 minutes, while applying a current density to the electrically conductive substrate in the range of 0.05 to 0.1 A/cm$^2$ and simultaneously chemically etching the electrically conductive substrate by oxidizing the electrically conductive substrate in the aqueous solution, and
    coating said electrically conductive substrate by applying a metallic or non-metallic coating to at least part of said activated outer surface of said electrically conductive substrate,
    wherein an adhesion strength between said coating and said electrically conductive substrate is at least 668 psi, as determined according to ASTM D4541-02 Method A-E, and
    said aqueous solution contains at least one etching compound selected from the group consisting of phosphoric acid, nitric acid, boric acid, sulfuric acid, chromic acid, hydrofluoric acid, a permanganate, sodium hypochloride, chlorine, bromine, peroxide, and ozone.

2. The process according to claim 1, wherein said anodic polarization and simultaneous chemical etching provides a surface roughness to the activated outer surface of said electrically conductive substrate in the range of Ra=0.01 micron to Ra=50 micron.

3. The process according to claim 1 which provides a coated electrically conductive substrate performing at least one temperature cycle without failure according to ASTM B553-71, service condition 1, 2, 3 or 4.

4. The process according to claim 1, wherein said electrically conductive substrate comprises a material selected from the group consisting of resins selected from the group consisting of epoxy resins, bismaleimide resins, polyester resins, urea resins, and melamine resins; thermoplastic polymers selected from the group consisting of polyolefins, polyethylenes, polypropylenes, polyamides, and polyimides; mineral filled polyamide resin composites; neoprenes; polyisoprenes; polybutadienes; polyisoprenes; polyurethanes; butadiene-styrene copolymers; chlorinated polymers comprising polyvinyl chlorides; fluorinated polymers comprising polytetrafluoroethylenes; polyesters; liquid crystal polymers comprising partially crystalline aromatic polyesters based on p-hydroxybenzoic acid; polycarbonates; acrylonitrile-butadiene-styrene; copolymers of the aforementioned; and blends of the aforementioned;
    wherein said electrically conductive substrate has been rendered electrically conductive by inclusion of between 2.5% and 95% per weight or volume of one or more electrically conductive fillers selected from the group consisting of carbon, carbon nanotubes, graphite, carbon fibers, graphite fibers, metals, metal alloys, metallized fibers and metal coated glass fibers.

5. The process according to claim 1 in which said electrically conductive substrate is an intrinsically electrically conductive polymer and, said intrinsically electrically conductive polymer is selected from the group consisting of halogen derivatives of polyacetylene, polyaniline, polypyrrole, polythiophane, poly-ethylenedioxythiophene, poly-phenylenevinylidene, poly-thiophene, poly-dialkylfluorene, polyanisidine and blends and derivatives of these base polymers.

6. The process according to claim 1 in which said electrically conductive substrate has an electrical conductivity of $>10^{-6}$ Sm$^{-1}$.

7. The process according to claim 1 in which said coating comprises a material selected from the group consisting of a metal selected from the group consisting of Ag, Au, B, C, Cu, Co, Cr, Mo, Ni, Sn, Fe, Pd, Pb, Pt, Rh, Ru, W and Zn and an alloy of two or more of the metals.

8. The process according to claim 1 in which said coated electrically conductive substrate is for use for an aerospace and/or defense component, an automotive component, a sporting goods component, an electronic equipment component, a molding application component and a medical application component.

9. The process according to claim 1 in which the electrically conductive substrate contains carbon fibers and/or graphite fibers.

10. The process according to claim 1, wherein said coating is applied to said substrate using a method selected from the group consisting of electroless deposition, electrodeposition, physical vapor deposition, chemical vapor deposition, gas condensation, and cold spraying.

11. The process of claim 1 providing an adhesion strength ranging from 668 to 5000 psi according to ASTM D4541-02 Method A-E and said electrically conductive substrate is a polymer composite comprising carbon fibers and bismaleimide.

12. The process of claim 1 providing an adhesion strength ranging from 750 to 5000 psi according to ASTM D4541-02 Method A-E.

13. The process of claim 1 providing an adhesion strength ranging from 1009 to 5000 psi according to ASTM D4541-02 Method A-E.

14. The process of claim 1 where the aqueous solution contains an acid selected from the group consisting of phosphoric acid, nitric acid, boric acid, sulfuric acid, chromic acid and hydrofluoric acid.

15. The method of claim 1, wherein the aqueous solution contains chromic acid.

16. The method of claim 1 where the aqueous solution contains a permanganate.

17. The method of claim 1, wherein the electrically conductive substrate is a pre-impregnated carbon fiber cloth/epoxy sheet.

18. The method of claim 1, wherein the electrically conductive substrate is a carbon fiber reinforced composite substrate.

19. The method of claim 1, wherein the coating is a metallic coating comprising nickel and/or iron.

* * * * *